United States Patent
Tominaga

(10) Patent No.: US 7,575,408 B2
(45) Date of Patent: Aug. 18, 2009

(54) WORK CONVEYING METHOD AND CONVEYING APPARATUS EMPLOYING THE CONVEYING METHOD

(75) Inventor: Makoto Tominaga, Hiroshima (JP)

(73) Assignee: Hirotec Corporation (JP)

( * ) Notice: Subject to any disclaimer, the term of this patent is extended or adjusted under 35 U.S.C. 154(b) by 270 days.

(21) Appl. No.: 11/646,581

(22) Filed: Dec. 28, 2006

(65) Prior Publication Data

US 2008/0163403 A1      Jul. 3, 2008

(51) Int. Cl.
  *B65B 21/02* (2006.01)
  *B65G 65/04* (2006.01)
  *B64F 5/00* (2006.01)
(52) U.S. Cl. ............... 414/416.08; 414/222.04; 414/331.18; 414/589; 414/801; 901/46
(58) Field of Classification Search ............ 228/49.6; 29/281.6, 33 P, 563; 414/222.03–222.09, 414/222.12–222.13, 225.01, 226.01, 226.03–226.05, 414/331.15, 416.08, 589, 796, 796.9, 797, 414/797.1, 800, 801, 806; 901/40, 46, 6
See application file for complete search history.

(56) References Cited

U.S. PATENT DOCUMENTS

| | | | | |
|---|---|---|---|---|
| 4,757,608 A | * | 7/1988 | Ochi | 29/787 |
| 5,350,269 A | * | 9/1994 | Azuma et al. | 414/416.08 |
| 5,645,391 A | * | 7/1997 | Ohsawa et al. | 414/416.03 |
| 5,984,623 A | * | 11/1999 | Smith et al. | 414/797 |
| 6,652,217 B2 | * | 11/2003 | Dettman et al. | 414/797 |
| 6,956,347 B2 | * | 10/2005 | Nihei et al. | 318/568.16 |
| 2006/0188250 A1 | * | 8/2006 | Takeda et al. | 396/544 |

FOREIGN PATENT DOCUMENTS

JP        11-321735        11/1999

* cited by examiner

*Primary Examiner*—Gregory W Adams
(74) *Attorney, Agent, or Firm*—Studebaker & Brackett PC; Donald R. Studebaker

(57) ABSTRACT

Plural wok pairs composed of a plurality of works are stored in work storing means. A movable sensor 45 fitted to a conveyance robot 5 detects the position of one of the work pairs in the work storing means, and the work gripping means 25 takes out a plurality of works at one time from the work storing means. One of the plurality of works is held temporarily by temporal work holding means 6 or 7 while the other work is conveyed to a jig Y. In the course of conveyance, a fixed sensor 63 detects the relative positional relationship between the work and the work gripping means 25. If the relative positional relationship deviates from the regular positional relationship, the movement of a robot arm 31 is corrected.

2 Claims, 14 Drawing Sheets

WORK CONVEYING METHOD AND CONVEYING APPARATUS EMPLOYING THE CONVEYING METHOD

BACKGROUND OF THE INVENTION

1. Field of the Invention

The present invention relates to a work conveying method and a conveying apparatus employing the conveying method.

2. Background Art

Conventionally, a door provided in an automobile, for example, is formed by joining an outer panel and an inner panel. A door having such a structure is manufactured in such a manner that: an outer panel and an inner panel (works) are formed by a press forming machine and then are stored once in work storing means, such as a pallet; the work storing means is conveyed to a site where a door assembling machine is placed; one of a plurality of works stored in the work storing means is taken out, is conveyed to an assembling jig, and is positioned at and held to the jig; and then, the work held to the jig is subjected to various kinds of assembling processes (see, Japanese Patent Application Laid Open Publication No. 11-321735A, for example).

In order to take out works stored in the work storing means from the work storing means and convey them to the jig as a target site, the operator is required to take out and convey the works carefully and accurately one by one so that the works are not deformed by being in contact with another work, the work storing means, peripheral machines, and the like. This restricts reduction in time required for conveying the works from the work storing means to the target site, involving difficulty in increasing the production efficiency.

SUMMARY OF THE INVENTION

The present invention has been made in view of the foregoing and has its object of increasing the production efficiency by automating a task of taking out works and conveying them up to a target site and by devising a work conveying procedure in the automated task.

To attain the above object, a first invention as an invention of a work conveying method is directed to a work conveying method for taking out given works out of a plurality of works stored in work storing means and conveying the given works to a target site, which includes the steps of: storing a plurality of work sets, each of which composed of a plurality of works, into the work storing means; taking out a plurality of works at one time from the work storing means by allowing work gripping means mounted at the tip end of a robot arm of a conveyance robot to grip a given work sets stored in the work storing means; allowing temporal work holding means to hold temporally a work other than a work to be conveyed first to the target site out of the given work sets; allowing the conveyance robot to convey to the target site the work to be conveyed first to the target site; and allowing, after the work to be conveyed first is conveyed to the target site, the work gripping means to grip the work held to the temporal work holding means and conveying it to the target site.

In the above arrangement, the work gripping means of the conveyance robot grips the given set of a plurality of works and takes out them from the work storing means at one time. Then, a work other than a work to be conveyed first to the target site out of the taken-out plural works is held temporally at the temporal work holding means while only the work to be conveyed first remains gripped by the work gripping means and is conveyed by the conveyance robot to the target site. After conveyance of the first work is completed, the conveyance robot moves the work gripping means to a site at which it is to grip the next work held to the temporary work holding means, rather than to the work storing means, and then grips the next work and convey it to the target site.

In short, the conveyance robot automatically conveys the works to the target site with the operator's labor eliminated. Further, a plurality of works are taken out at one time from the work storing means, which eliminates the need to perform the step of moving the work gripping means to the work storing means for taking out a work every time conveyance of one work is completed, reducing time required for conveying the works as a whole. The work storing means stores a plurality of works in the form of sets to increase the space efficiency, resulting in that the number of works that the work storing means can store increases. This lowers the frequency of carrying in and out the work storing means. Thus, the production efficiency increases.

A second invention as an invention for a work conveying method is directed to a work conveying method for taking out a given work out of a plurality of works stored in work storing means and conveying the work to a target site, which includes the steps of: allowing a conveyance robot to move a movable sensor, which is fitted to work gripping means provided at the tip end of a robot arm and is capable of detecting a three-dimensional position of a subject, and allowing the movable sensor to detect a three-dimensional position of the given work stored in the work storing means; allowing the conveyance robot to move the work gripping means, on the basis of information on the three dimensional position of the given work detected by the movable sensor, to a place where the given work is to be gripped and allowing the work gripping means to grip the given work; and allowing a fixed sensor to detect a relative positional relationship between the work gripped by the work griping means and the work gripping means, correcting movement of the robot arm on the basis of a detection result, and conveying the work to the target site.

In the above arrangement, after the movable sensor detects the three-dimensional position of a work set, the work gripping means grips the work set. Accordingly, the work set can be gripped by the work gripping means without failure even if the position where the work storing means is placed or the position where the work set is stored would be displaced. The fixed sensor, which is immovable and performs accurate detection in contrast to the movable sensor, detects the relative positional relationship between the work and the work gripping means. This enables, when the relative positional relationship deviates from the regular positional relationship, exact correction of the movement of the robot arm for work conveyance.

As a result, this invention reduces time required for work conveyance by automating the work conveyance and needs less or no positional correction of the work after conveyance by conveying the work to the target site accurately, thereby increasing the production efficiency.

A third invention as an invention for a work conveying apparatus employs an arrangement which includes: the work storing means in which a plurality of work sets are stored, each of the plurality of work sets being composed of a plurality of works; a conveyance robot which includes a robot arm having work gripping means for gripping a given work set stored in the work storing means and which conveys a work gripped by the work gripping means to the target site; temporal work holding means which holds temporally a work other than a work to be conveyed first to the target site out of the given work set gripped by the work gripping means; a movable sensor fitted to the work gripping means and being capable of detecting a three-dimensional position of the given work set stored in the work storing means; a fixed sensor being capable of detecting a relative positional relationship between the work gripped by the work gripping means and the work gripping means; and a controller to which the movable sensor and the fixed sensor are connected and which controls the conveyance robot on the basis of output signals from the sensors, wherein the controller allows, on the basis of information on the three-dimensional position of the given work set detected by the movable sensor, the work gripping means to move to a place where the given work set is to be gripped, and the controller corrects, on the basis of information on the relative positional relationship between the works and the work gripping means detected by the fixed sensor, movement of the robot arm so that the work is conveyed to the target site.

In the above arrangement, similarly to the first invention, work conveyance is automated, and it becomes unnecessary to move the work gripping means to the work storing means for taking out works every time conveyance of one work is completed, thereby reducing time required for work conveyance as a whole. In addition, the number of works that single work storing means can store increases to lower the frequency of carrying in and out the work storing means. Thus, the production efficiency increases.

Furthermore, every work can be conveyed to the target site accurately to eliminate the need for positional correction of the work after conveyance. This also increases the production efficiency.

The third invention may have the following arrangement. Namely, each of the work sets stored in the work storing means is composed of a plurality of panel-like works overlaid with each other in the thickness direction, the work gripping means includes a cylinder which extends and contracts by supply and discharge of working fluid and a suction cup fitted at the tip end of a rod of the cylinder, the cylinder allowing the rot to extend and contract freely by external force under a state that no working fluid is supplied, the suction cup grips a work out of the given work set which is located on one side in the thickness direction of the given work set, and the temporal work holding means grips a work located on the other side in the thickness direction of the given work set.

With the above arrangement, the other work can be held to the temporal work holding means without taking off the work to be conveyed first to the target site from the suction cup of the work gripping means, thereby further reducing time required for work conveyance. Further, deformation and damage of the works in sucking the works to the suction cup can be suppressed.

DETAILED DESCRIPTION OF THE INVENTION

Hereinafter, one embodiment of the present invention will be described in detail with reference the accompanying drawings. It should be noted that the following preferable embodiment substantially describes a mere example and is not intended to limit the present invention, applicable objects thereof, and use thereof.

Figure 1:
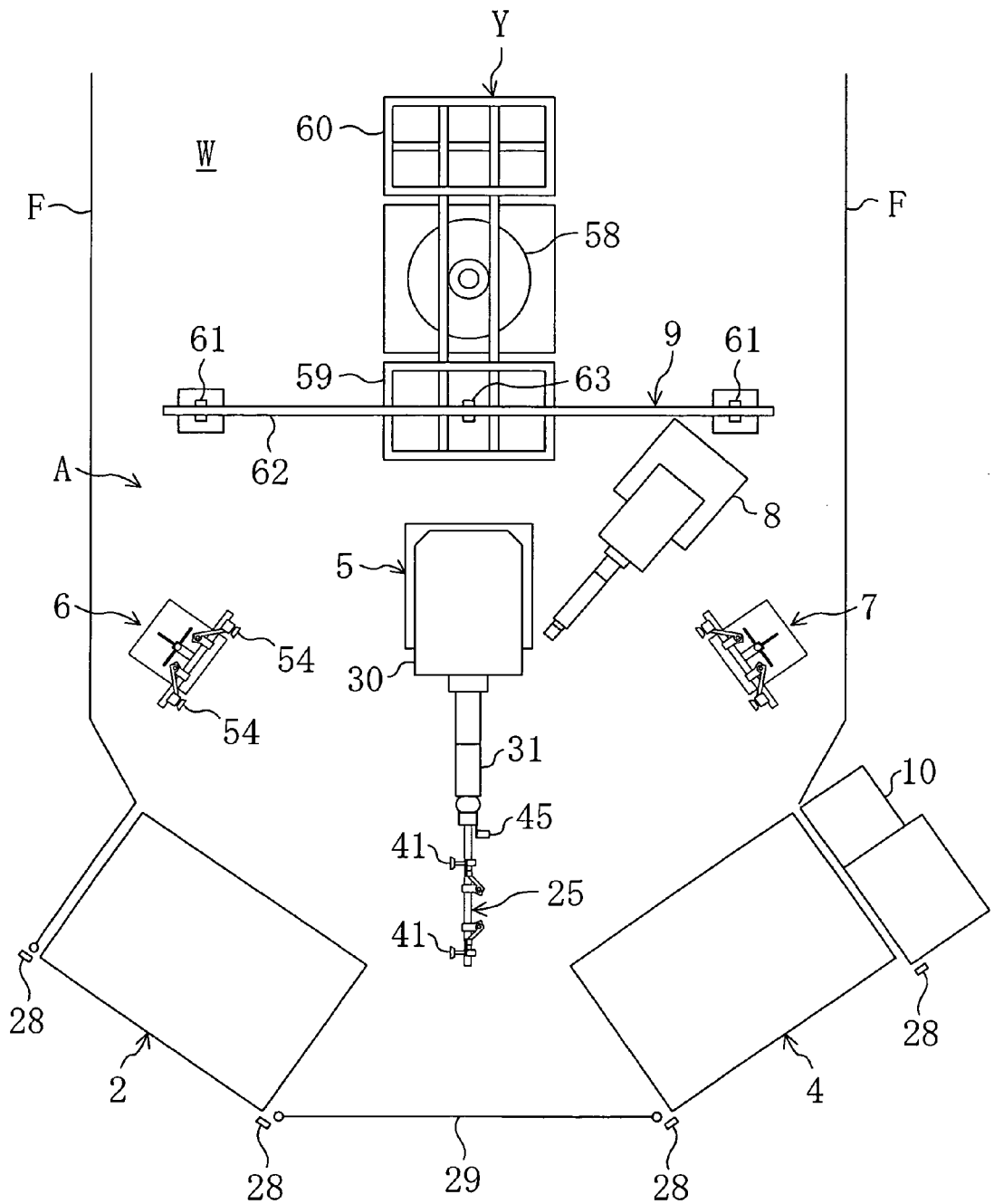
FIG. 1 is a plan view of a factory in which a conveying apparatus is installed.

FIG. 1 shows a work conveying apparatus A according to the embodiment of the present invention. The conveying apparatus A is installed in a factory W for assembling doors (not shown) to be provided at the respective sides of an automobile. The conveying apparatus A conveys outer panels P (work) of a door to a fixed point of a jig Y for a step thereafter.

Figure 2A:
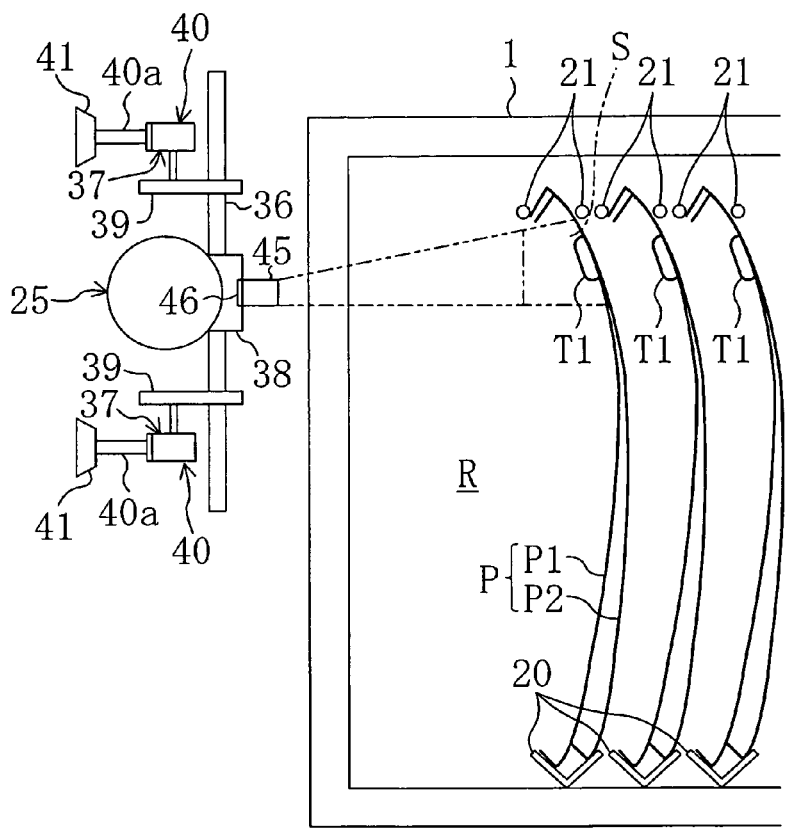
FIG. 2A is a plan view showing a part of a pallet under the state where a movable sensor detects the three-dimensional position of an outer panel pair.
Figure 2B:
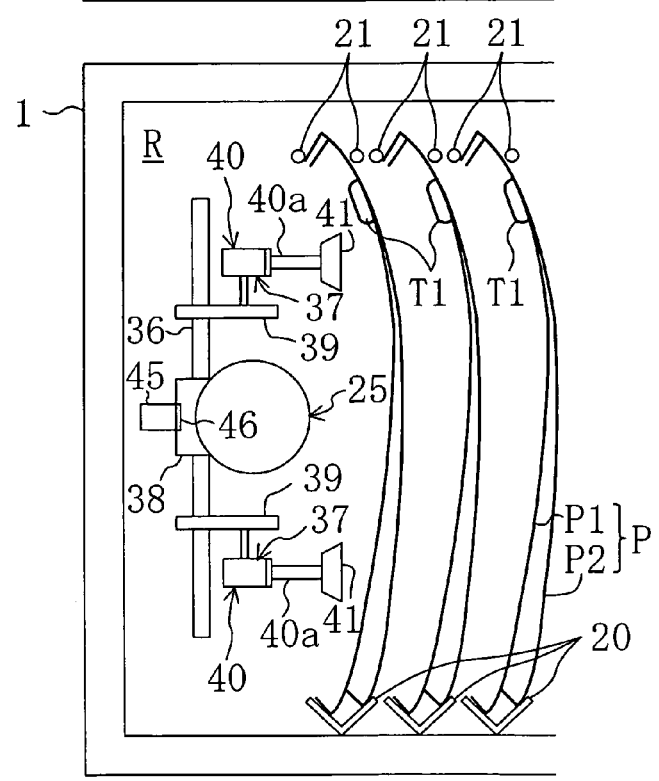
FIG. 2B is a view corresponding to FIG. 2A and showing a state that a gripping material handling tool enters in a material handling entering space of the pallet.
Figure 3:
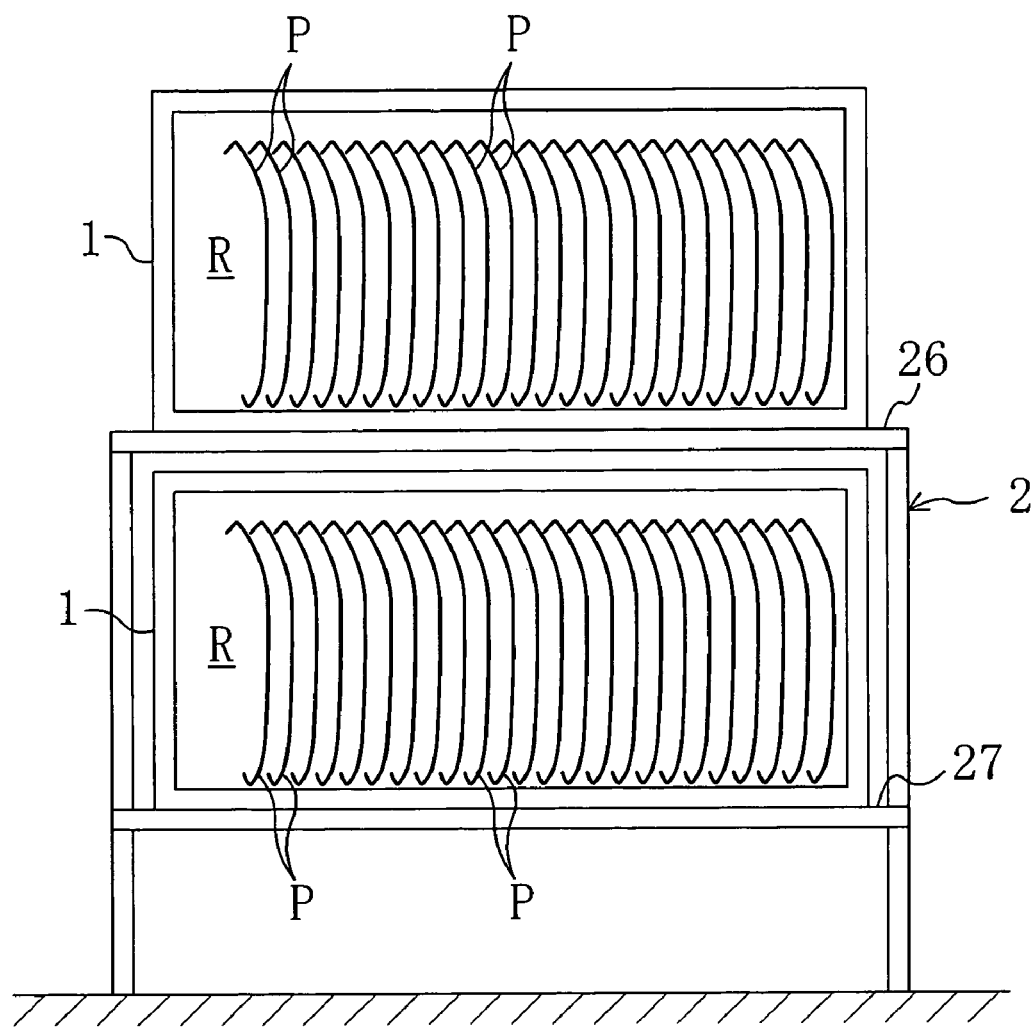
FIG. 3 is a front view showing a state that two pallets are placed on a right door rack.

Before describing the construction of the conveying apparatus A, the outer panels P will be described first. The outer panels P are formed by press-forming steel plates and each have an intermediate part in the vertical direction which is curved outboard greatly when mounted to an automobile, as shown in FIG. 2A, FIG. 2B, and FIG. 3. The upper edge part and the lower edge part of each outer panel P are folded inboard. In the upper part of each outer panel P, a mounting portion T to which an outer handle (not shown) is mounted is provided at a part thereof on the vehicle rear side. The mounting portion T includes a recessed part T1 recessed inboard and a plurality of openings T2 which are aligned along the longitudinal direction of the vehicle.

In the factory W, as shown in FIG. 1, there are installed with a space therebetween left a right door rack 2 on which right door component pallets 1 for storing right door outer panels P are placed and a left door rack 4 on which left door component pallets (not shown) for storing left door outer panels P are placed. A conveyance robot 5 is installed so as to face both the racks 2, 4, and a right side temporal holder 6 and a left side temporal holder 7 are installed at places remote on the conveyance robot 5 side from the racks 2, 4, respectively. The jig Y is installed on the opposite side of the conveyance robot 5 from the racks 2, 4, and a sealant coating robot 8 for coating the outer panels P with a sealant (not shown) is installed between the jig Y and the left side temporal holder 7. A sensor support table 9 in the form of a gate astride the jig Y is installed in the vicinity of the jig Y. Reference F in each drawing denotes a fence. A controller 10 for the conveyance robot 5 is installed outside the fence F.

The right door rack 2 and the left door rack 4 are arranged inside the fence F. The left door component pallets and the left door rack 4 have the same structures as the right door component pallets 1 and the right door rack 2, respectively, and therefore, only the right door component pallets 1 and the right door rack 2 will be described below. Each right door component pallet 1 is formed by assembling a plurality of bars into a rectangular parallelpiped frame, as shown in FIG. 2A, FIG. 2B, and FIG. 3. In each right door component pallet 1, as shown in FIG. 2A and FIG. 2B, a plurality of outer panel pairs P (two outer panels P forms one pair) are stored in a row in the widthwise direction of the pallet 1. The direction of the stored outer panel pairs P is such that the upper part of each outer panel P is located on the upper side of the corresponding pallet 1 while a part on the vehicle rear side of each outer panel P is located on the conveyance robot 5 side of the corresponding pallet 1. Wherein, the outer panel pairs P correspond to work sets.

As will be described later in detail, one of the outer panel pairs P is conveyed in such a manner that: they are taken out from the corresponding right door component pallet 1 at the same time; one P1 of the paired outer panels (shown in FIG. 2A and FIG. 2B) is conveyed first to the jig Y; and then, the other outer panel P2 is conveyed to the jig Y. The one panel P1 is overlaid with the other outer panel P2 so that the outboard face of the one outer panel P1 faces the inboard face of the other outer panel P2 and so that the space between the panels P1, P2 is narrowed. When the two outer panels P1, P2 are paired by overlaying them in the thickness direction with them set close to each other as described above, the number of the outer panels P that a single right door component pallet 1 can store increases. This lowers the frequency of moving the racks 2, 4 between a site where the press forming machine (not shown) is installed and a site where the conveying apparatus A is installed.

Lower part support members 20 each for supporting the lower edge parts of the paired outer panels P from the lower side are arranged in the lower part of each right door component pallet 1 at regular intervals in the widthwise direction of the pallets 1. While, upper part support members 21 for supporting the upper edge parts of the paired upper panels P from both the outboard and inboard sides of the outer panel pair P are arranged at the upper part of each right door component pallet 1, like the lower part support members 20. One pair of the outer panels P1, P2 are arranged between one pair of the upper part support members 21. The one outer panel P1 of the outer panels P1, P2 abuts at the upper edge part thereof on the lower part of the upper edge part of the other outer panel P2 so that the upper edge parts of the outer pallets P1, P2 are engaged with each other at the folded parts thereof.

The lower edge parts of the outer panels P1, P2 are supported by one lower part support member 20. The lower edge part of the one outer panel P1 is located outside the lower edge part of the other outer panel P2, and both the lower edge parts of the paired outer panels P are in contact with the lower part support member 20.

At one side part in the widthwise direction of the right door component pallet 1, a material handling entering space R is formed into which a gripping material handling tool 25 (work gripping means) for gripping the outer panels is to enter. The gripping material handling tool 25 is mounted at the conveyance robot 5. The recessed side, that is, the inboard side of each outer panel P faces the material handling entering space R. It is noted that the work gripping means may be any means for gripping the works other than the gripping material handling tool 25.

As shown in FIG. 3, an upper placement portion 26 and a lower placement portion 27 for placing the right door component pallets 1 are provided at the upper half part and the lower half part of the right door rack 2, respectively. Namely, the two right door component pallets 2 are placed on the upper and lower two stages of the right door rack 2. The right door component pallet 1 placed on the upper placement portion 26 and the right door component pallet 1 placed on the lower placement portion 27 are replaceable by other right door component pallets one by one by means of a fork lift or the like. Specifically, when no outer panel P is present in the right door component pallet 1 on one of the upper and lower placement portions 26 or 27, outer panels are taken out from the other pallet 1 while the one pallet 1 is replaced by another right door component pallet storing the outer panel pairs P, which suppressing loss time consumed by pallet replacement. Phototubes 28 are installed on the opposite sides of the right door rack 2 and the left door rack 4 from the conveyance robot 5, as shown in FIG. 1. The phototubes 28 are connected to the controller 10 so as to inhibit the conveyance robot 5 from taking out an outer panel pair P from a pallet 1 to be replaced during replacement of the pallets 1. A door 29 is provided between the phototubes 28.

Figure 4:
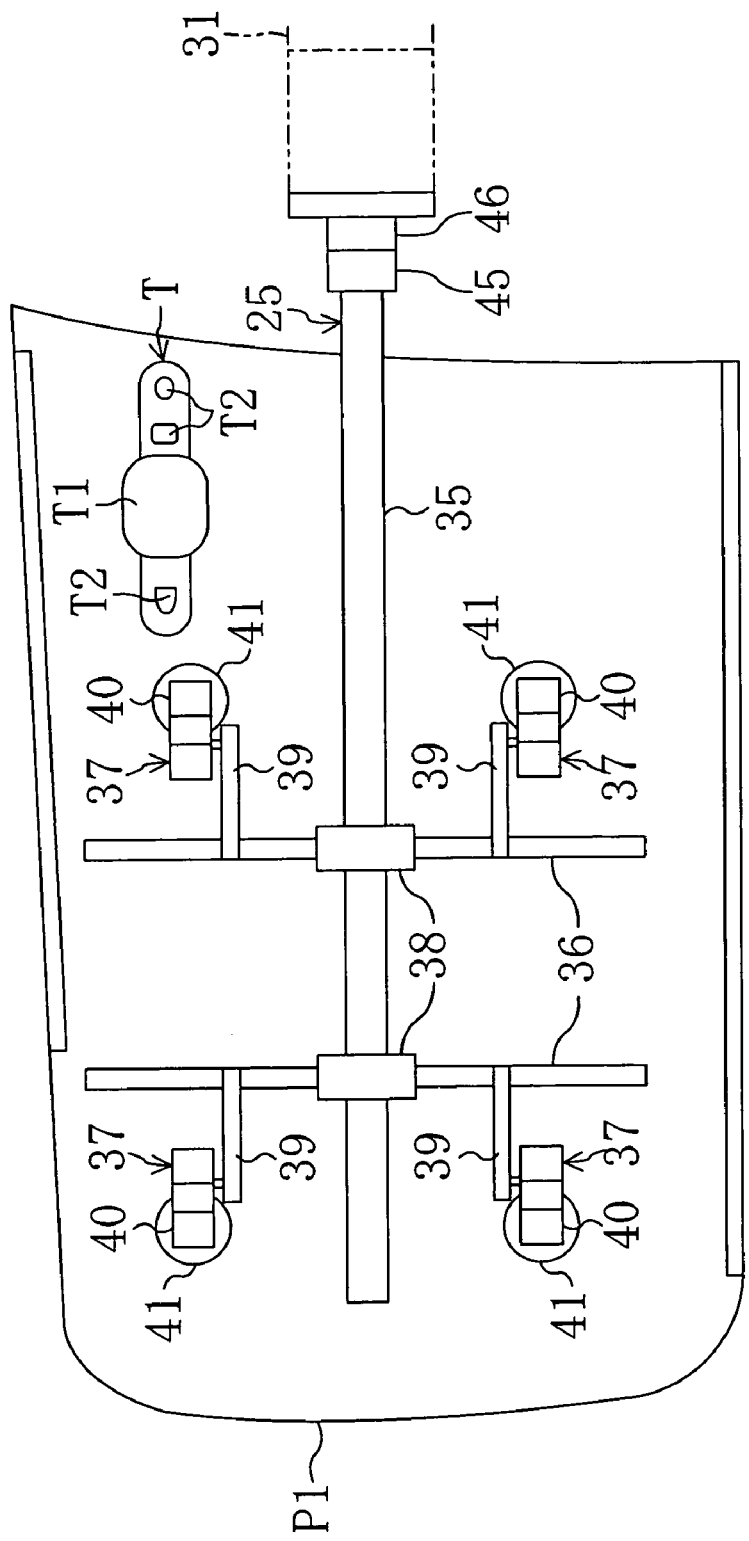
FIG. 4 is a side view of an outer panel gripped by the gripping material handling tool when viewed from the gripping material handling tool side.
Figure 5A:
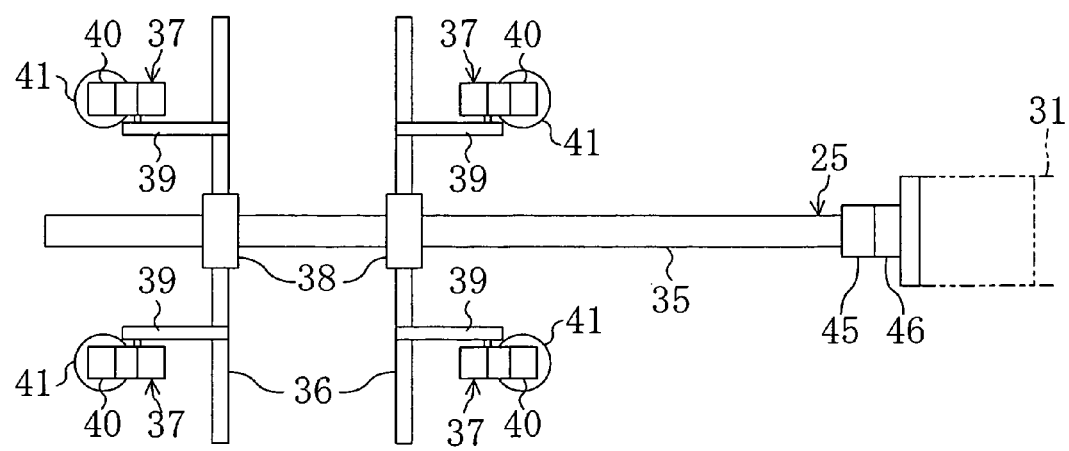
FIG. 5A is a side view of the gripping material handling tool when viewed from the side opposite to the suction faces of suction cups.
Figure 5B:
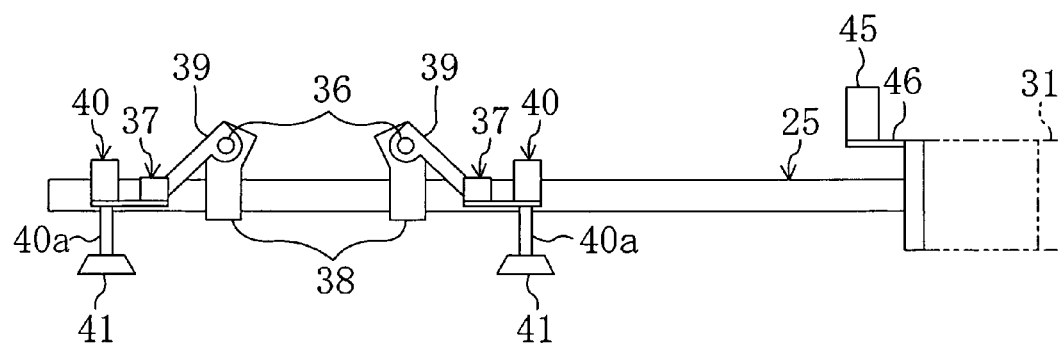
FIG. 5B is a plan view of the gripping material handling tool.

The conveyance robot 5 is of multi-axis control type generally used in factories and includes a robot arm 31 extending from a main body 30 thereof. The tip end of the robot arm 31 rotates around a frame axis of the robot arm 31. The gripping material handling tool 25 is mounted at the tip end of the robot arm 31, as shown in FIG. 5A and FIG. 5B. The gripping material handling tool 25 is so composed to grip one of the outer panel pairs P and includes a center member 35 extending in the direction of the frame axis of the robot arm 31, two support bars 36 mounted so as to intersect at a right angle with the center member 35, and four gripping parts 37 supported by the corresponding support bars 36. The center member 35 has a length approximately the same as the length in the longitudinal direction of the vehicle of each outer panel P, as shown in FIG. 4. The support bars 36 are mounted to the center member 35 by movable mechanisms 38, such as clamp mechanisms. When the movable mechanisms 38 release the fixed state of the support bars 36 to the center member 35, the support bars 36 become movable in the longitudinal direction of the center member 35 and rotatable around the center member 35. The moveable mechanisms 38 fix the support bars 36 at arbitrary points of the center member 35

Figure 6:
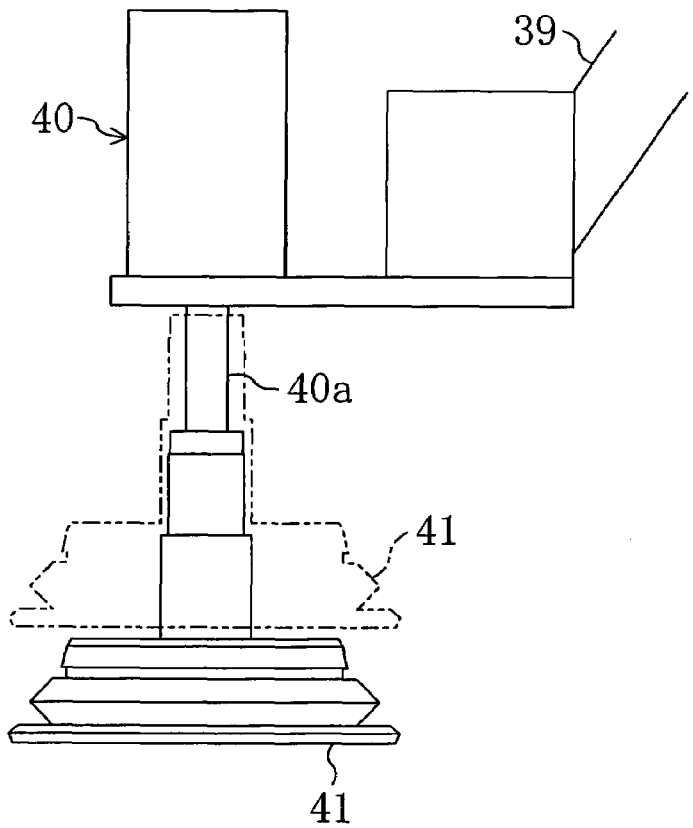
FIG. 6 is an enlarged view showing the vicinity of a gripping part of the gripping material handling tool.

The gripping parts 37 are mounted at the respective ends of the support bars 36 and have the same structure. Each of the gripping parts 37 includes, as shown in FIG. 6, a bracket 39 extending from the corresponding support bar 36, a cylinder 40 mounted at the bracket 39, and a rubber-made suction cup 41 mounted at the tip end of a rod 40a of the cylinder 40. The bracket 39 is of movable type changeable in inclination angle of the cylinder 40 and in position of the cylinder 40 relative to the corresponding support bar 36. Each cylinder 40 is a known one that makes the rod 40a to advance and recede by supplying and discharging working fluid, such as compressed air or the like from the outside. Each cylinder 40 in the present embodiment is of low friction type of which sliding friction at the rod 40a is extremely low and is so composed that the rod 40a recedes and advances freely upon receipt of external force in the axial direction thereof under the state that the working fluid is not supplied.

A state that the rod 40*a* of one of the cylinders 40 recedes is indicated by a virtual line in FIG. 6. The stroke of the rod 40*a* of each cylinder 40 is set to be approximately 30 mm, for example. Each cylinder 40 is controlled by a cylinder control valve (not shown). Each suction cups 41 is a conventional one used for gripping a panel member and is arranged so that the suction face thereof faces the opposite side of the corresponding suction cup 41 from the corresponding rod 40*a*. Though not shown, negative pressure by a negative pressure piping acts on the suction faces of the suction cups 41. It is noted that magnets, clamps, or the like may be used rather than the suction cups 41 of the gripping parts 37.

Figure 7:
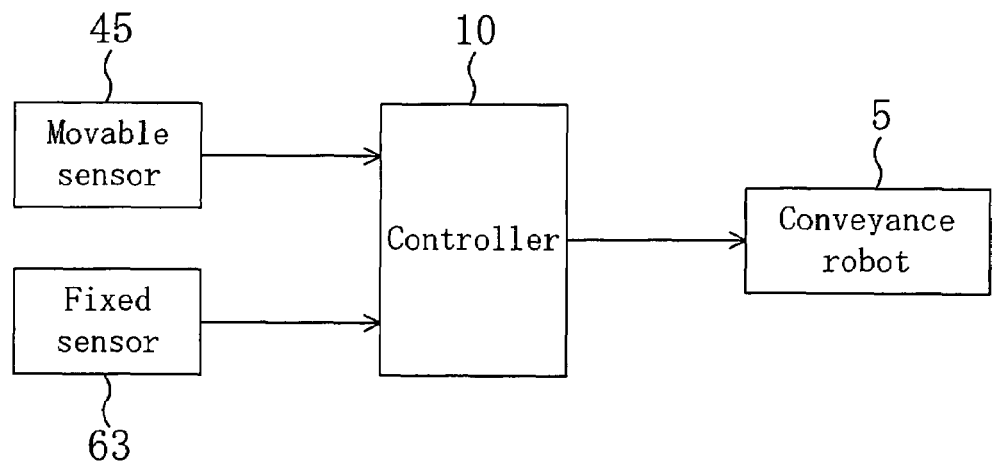
FIG. 7 is a block diagram of a conveyance robot.

A movable sensor 45 is mounted at the end on the robot arm 31 side of the gripping material handling tool 25 by means of a stay 46, as shown in FIG. 5A and FIG. 5B. The movable sensor 45 detects the three-dimensional position of the outer panel pair P in the pallet 1 before the gripping material handling tool 25 grips the outer panel pair P. The movable sensor 45 is a known stereo sensor including an irradiator (not shown) for irradiating semiconductor laser light for distance measurement and a camera for shape recognition and detects the three-dimensional position of the outer panel pair P by grasping a mark, such as any of the openings T2, the recessed part T1 of the paired outer panels P from an image captured by the camera and measuring three-dimensionally the distance between the outer panel pair P and the movable sensor 45 by the irradiator. With the movable sensor 45, the conveyance robot 45 bears a three-dimensional visual function. The movable sensor 45 is connected to the controller 10, as shown in FIG. 7.

Figure 8A:
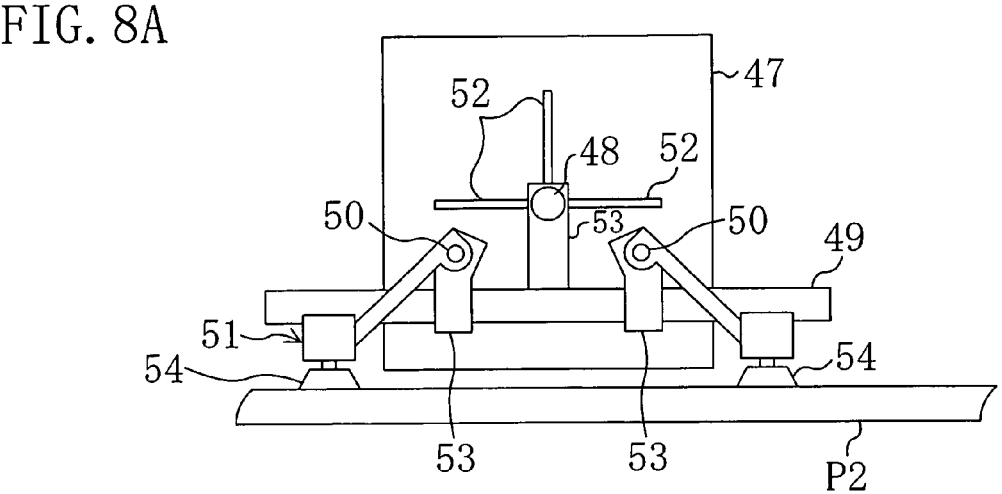
FIG. 8A is a plan view of a right side temporal holder which holds an outer panel.
Figure 8B:
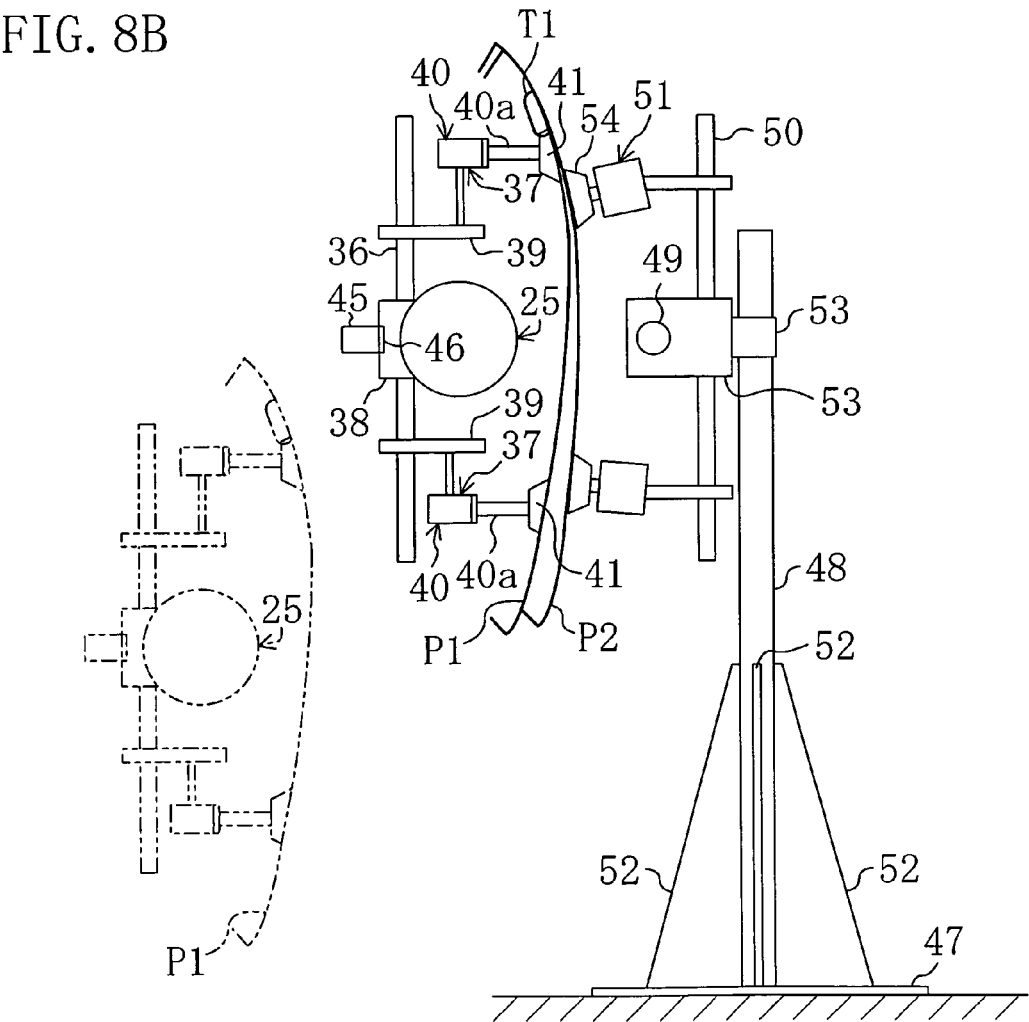
FIG. 8B is a side view of the right side temporal holder which holds the outer panel pair.
Figure 9:
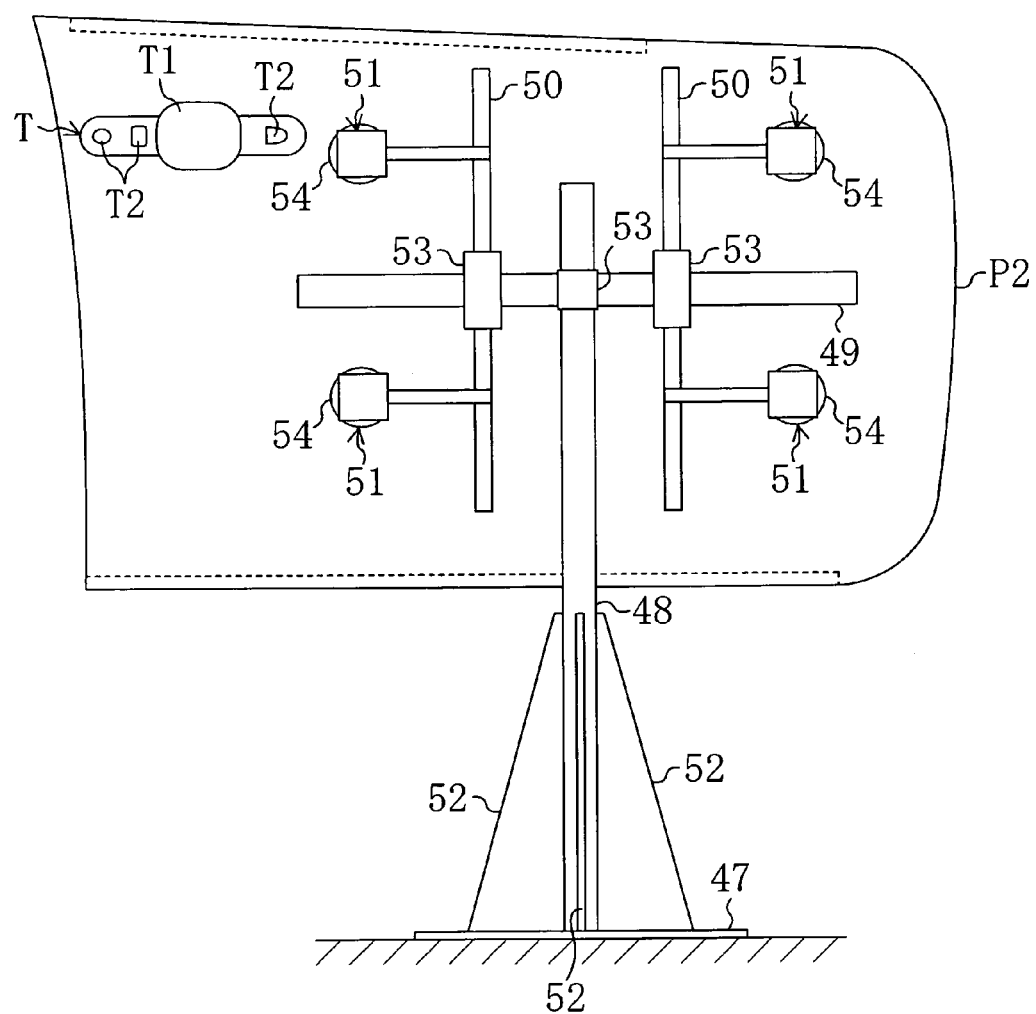
FIG. 9 is a front view of the right side temporal holder which holds the outer panel.

The right side temporal holder 6 serves as a temporal work holding means in the present invention for holding the other outer panel P2 temporally after one pair of outer panels P1, P2 are taken out from one of the right door component pallets 1. The right side temporal holder 6 includes, as shown in FIG. 8A, FIG. 8B, and FIG. 9, a base plate 47 fixed to the ground of the factory, a support pole 48 extending upward from the central part of the base plate 47, a lateral bar 49 mounted at the upper part of the support pole 48, two support bars 50 mounted at the respective ends of the lateral bar 49, and four holding parts 51 supported at the respective ends of the support bars 50. Reference numeral 52 denotes a reinforcing plate provided for joining the upper face of the base plate 47 and the outer face of the support pole 48.

The lateral bar 49 is mounted to the support pole 48 by means of a movable mechanism 53, such as a clamp mechanism. When the movable mechanism 53 releases the fixed state of the lateral bar 49 to the support pole 48, the lateral bar 49 becomes movable in the vertical direction and rotatable around the support pole 48. The movable mechanism 53 fixes the lateral bar 49 at an arbitrary point of the support pole 48. As well, the support bars 50 are mounted to the lateral bar 49 by means of similar movable mechanisms 53 so as to be fixed at arbitrary points of the lateral bar 49. The holding parts 51 include suction cups 54 similar to the suction cups 41 of the gripping parts 37, and each suction cup 54 is arranged so that at least a part of the suction face thereof overlaps with the suction face of the corresponding suction cup 41 of the corresponding gripping part 37 when the suction cups 54 face the suction cups 41. Magnets or clamps may be used rather than the suction cups 54 of the holding parts 51. It is noted that the left side temporal holder 7 has the same structure as the right side temporal holder 6.

The jig Y is fixed on the upper face of a swivel table 58 that rotates around the axis extending substantially perpendicularly, as shown in FIG. 1. The jig Y includes a right door fixing section 59 to which the right door outer panel P is fixed with its inboard face facing upward and a left door fixing section 60 to which the left door outer panel is fixed with its inboard face facing upward.

The sealant coating robot 8 is controlled by a controller (not shown) and coats each peripheral part of the right and left door outer panels P with a sealant.

The sensor support table 9 includes two side part forming members 61 vertically extending at the respective ends of the jig Y and fixed at the lower end thereof to the ground and an upper part forming member 62 extending so as to join the upper parts of the side part forming members 61. The upper part forming member 62 is arranged above the outer panel P when fixed to the jig Y so as to be a predetermined distance apart therefrom. A fixed sensor 63 is mounted at the central part in the longitudinal direction of the upper part forming member 62. The fixed sensor 63 includes a downward camera (not shown). On the basis of an image captured by the camera, the fixed sensor 63 recognizes the mark on the vehicle rear end side of the outer panel P and an arbitrary mark of the gripping material handling tool 25 to detect a relative positional relationship between the outer panel P and the gripping material handling tool 25. The fixed sensor 63 is connected to the controller 10, as shown in FIG. 7.

The controller 10 includes a known arithmetical unit, a storage device, a display device, and the like and controls the robot arm 31 by grasping the positional relationship between the robot arm 31 and a tool, the outer panel(s) P, or the like present therearound on the basis of an output signal from the movable sensor 45 or the fixed sensor 63. The conveying apparatus A of the present invention is composed of the racks 2, 4, the right and left pallets 1, the conveyance robot 5, the movable sensor 45, the right and left temporal holders 6, 7, the fixed sensor 63, and the controller 10.

Description will be given next to the case where the conveying apparatus A constructed as above takes out the right door outer panel pair P and the left door outer panel pair P from one of the right door component pallets 1 and one of the left door component pallet, respectively, and conveys them separately to the jig Y. In the present embodiment, a procedure for conveying the right door outer panel pair P will be described first. In this procedure, the right door fixing section 59 of the jig Y is set to face the conveyance robot 5.

In the case, as shown in FIG. 2A and FIG. 2B, where the outer panels P are stored in all the part of one of the right door component pallets 1 with the material handling entering space R left, one pair of outer panels P1, P2 facing the material handling entering space R is taken out first. Thereafter, the outer panels P facing the material handling entering space R thereafter will be taken out one pair by one pair. The right door component pallets 1 and the right door rack 2 are placed perfunctorily, and the positions where the lower part support members 20 and the upper part support members 21 of the pallets 1 are mounted would include an error. Therefore, the outer panel pair P to be taken out are not necessarily placed at a predetermined position when taking them out first. With this taken into consideration, the three-dimensional position of the outer panel pair P in one of the right door component pallets 1 is detected before the gripping material handling tool 25 grips the outer panel pair P.

Figure 10:
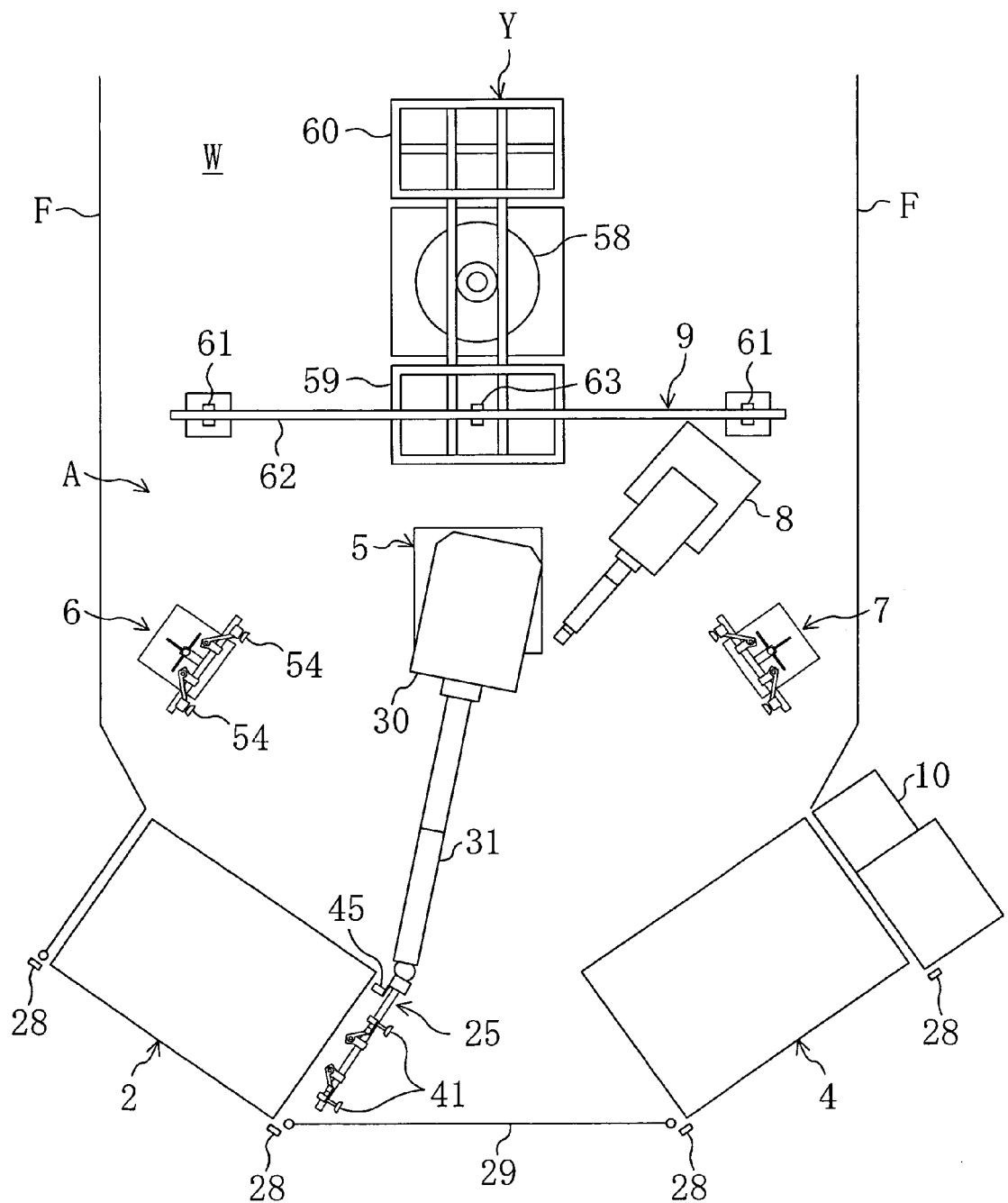
FIG. 10 is a view corresponding to FIG. 1 and showing a state that the three-dimensional position of the outer panel pair is detected.

For taking out the outer panel pair P facing the material handling entering space R, as shown in FIG. 2A and FIG. 10, the conveyance robot 5 moves the gripping material handling tool 25 to a point outside the corresponding right door component pallet 1 and in front of the inboard face of the one outer panel P1 to be taken out first, and the robot arm 31 moves to rotate the movable sensor 45 so that the laser irradiating direction, namely, the detecting direction of the sensor 45 is directed to the outer panel pair P. Then, the movable sensor 45 is positioned in front of the recessed part T1 and the openings T2 of the outer panel pair P. The thus positioned movable sensor 45 detects the three-dimensional position of the outer panel pair P.

The gripping material handling tool 25 is set outside the right door component pallets 1 because the detection range S of the movable sensor 45 ranges a given distance apart from the sensor 45. In other words, the movable sensor 45 is positioned so that the outer panel pair P to be taken out first falls within the detection range S of the movable sensor 45.

Following detection by the movable sensor 45, the robot arm 31 moves to rotate the gripping material handling tool 25 approximately 180°, the cylinders 40 is opened to the air with the rod 40a of each cylinder 40 advancing and with no compressed air supplied to the cylinders 40. This releases the rods 40a in the receding direction so that small force in the receding direction makes the rods 40a to move and recede.

Figure 11:
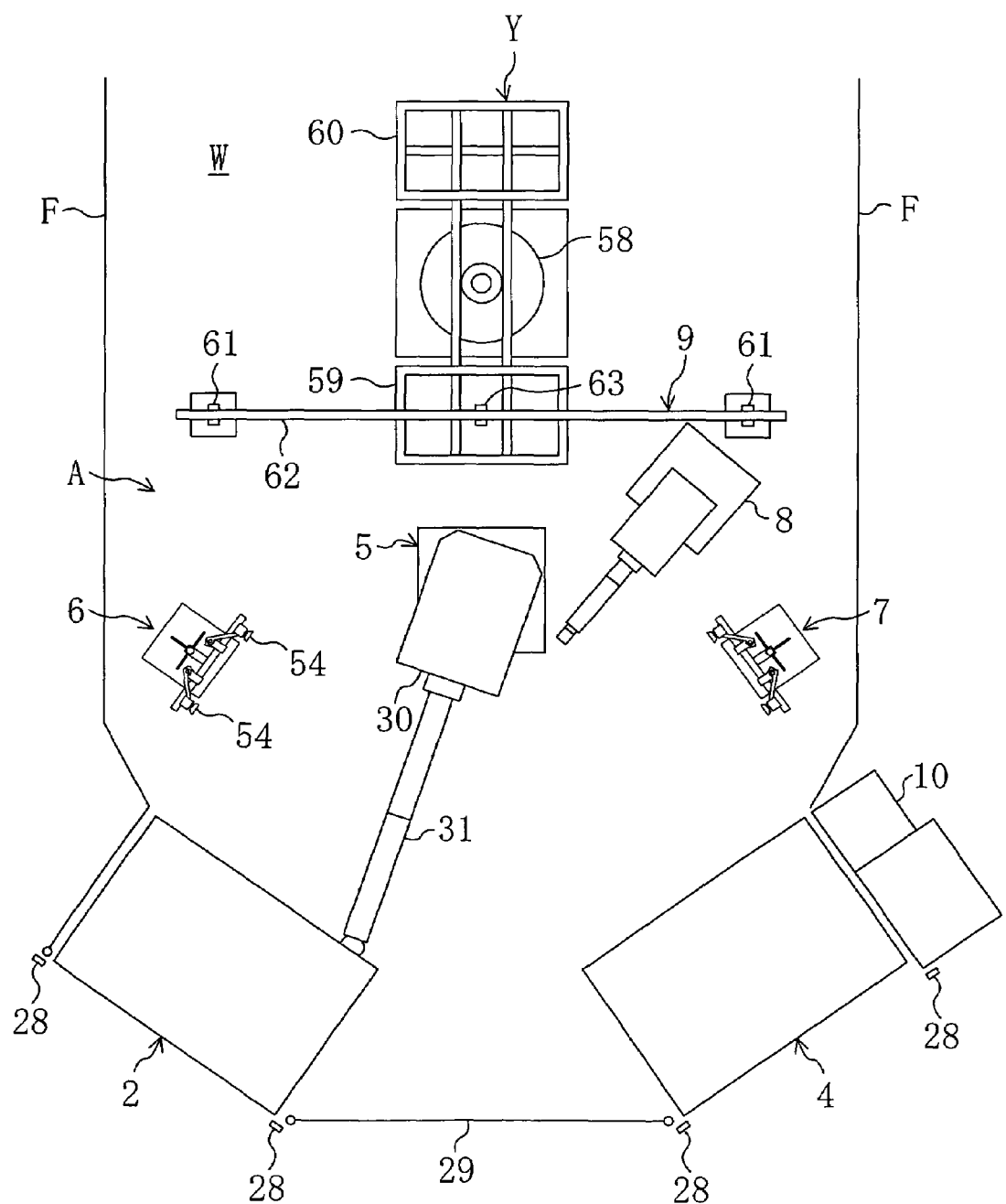
FIG. 11 is a view corresponding to FIG. 1 and showing a state that the outer panel pair are gripped.

Subsequently, the gripping material handling tool 25 is moved on the basis of the detection result of the movable sensor 45 to enter into the material handling entering space R of the right door component pallet 1, as shown in FIG. 11, so as not to be in contact with any outer panels P. After entering into the material handling entering space R, the gripping material handling tool 25 is made to approach to the one outer panel P1 and allows the suction cups 41 to be in contact with the one outer panel P1. At that time, the cylinders 40 are in a free state, and accordingly, the suction cups 41 receive counterforce from the one outer panel P1 to recede readily, thereby preventing the suction cups 41 from being in hard contact with the one outer panel P1. As a result, deformation and damage of the one outer panel P1 is suppressed. With the four cylinders 40, all of the four suction cups 41 can be in contact with the one outer panel P1 in the same fashion even if the one outer panel P1 is distorted and deformed to some extent. Suction of the one outer panel P1 by the suction cups 41 means gripping thereof by the gripping material handling tool 25

Thereafter, the gripping material handling tool 25 is pulled out from the material handling entering space R of the right door component pallet 1. The other outer panel P2 is engaged with the one outer panel P1 sucked by the suction cups 41, thereby enabling the two outer panels P1, P2 to be taken out at one time from the right door component pallet 1. Further, since the cylinders 40 are in the free state when the gripping material handling tool 25 is pulled out from the material handling entering space R of the right door component pallet 1, the outer panel pair P is displaceable in the receding direction of the rods 40a relative to the gripping material handling tool 25.

Following taking out of the pair of outer panels P1, P2 from the right door component pallet 1, the rods 40a are made to advance by supplying the compressed air to the cylinders 40, so that the gripping material handling tool 25 and the outer panel pair P are fixed and becomes undisplaceable.

Figure 12:
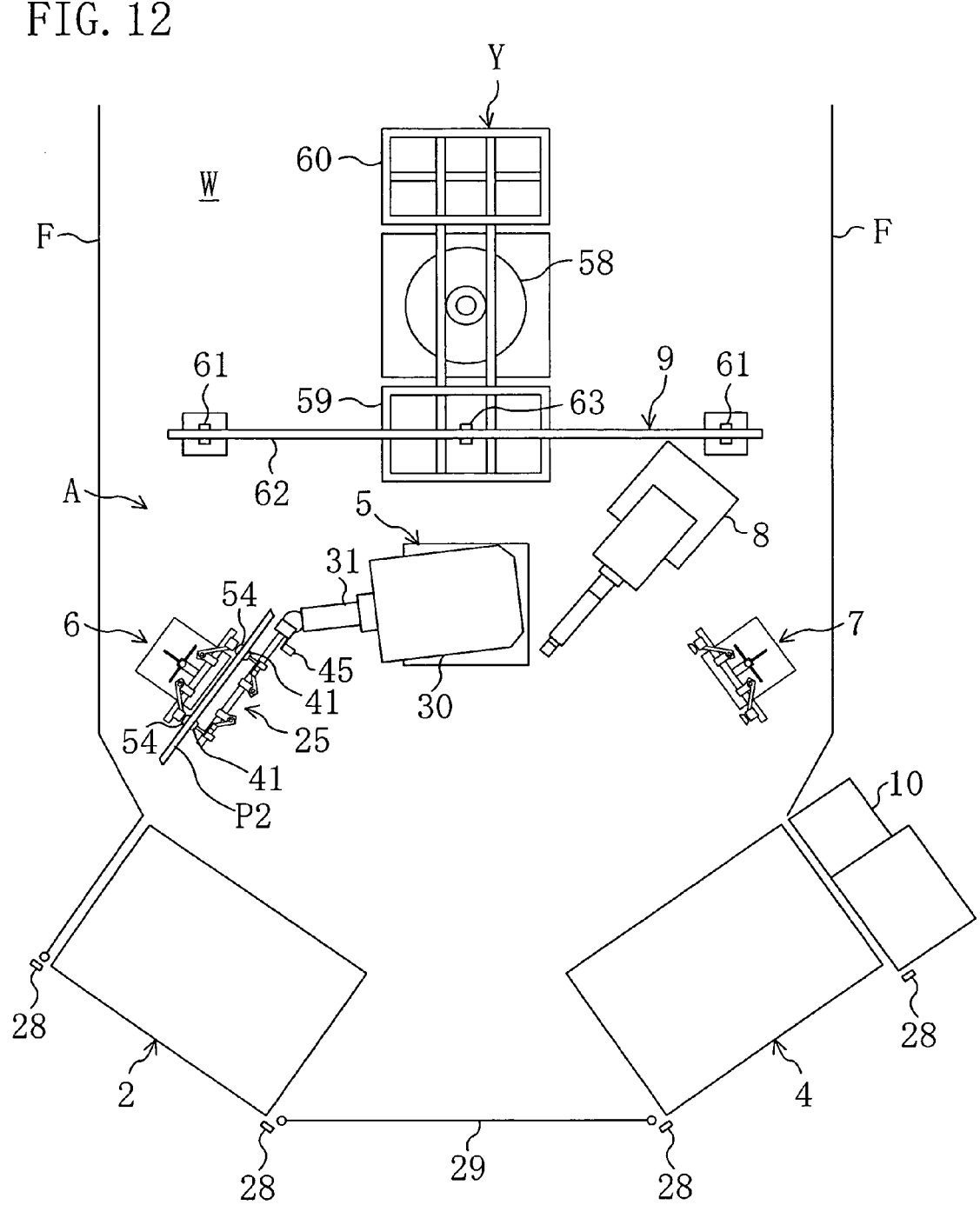
FIG. 12 is a view corresponding to FIG. 1 and showing a state that the right side temporal holder one of the outer panels.
Figure 13:
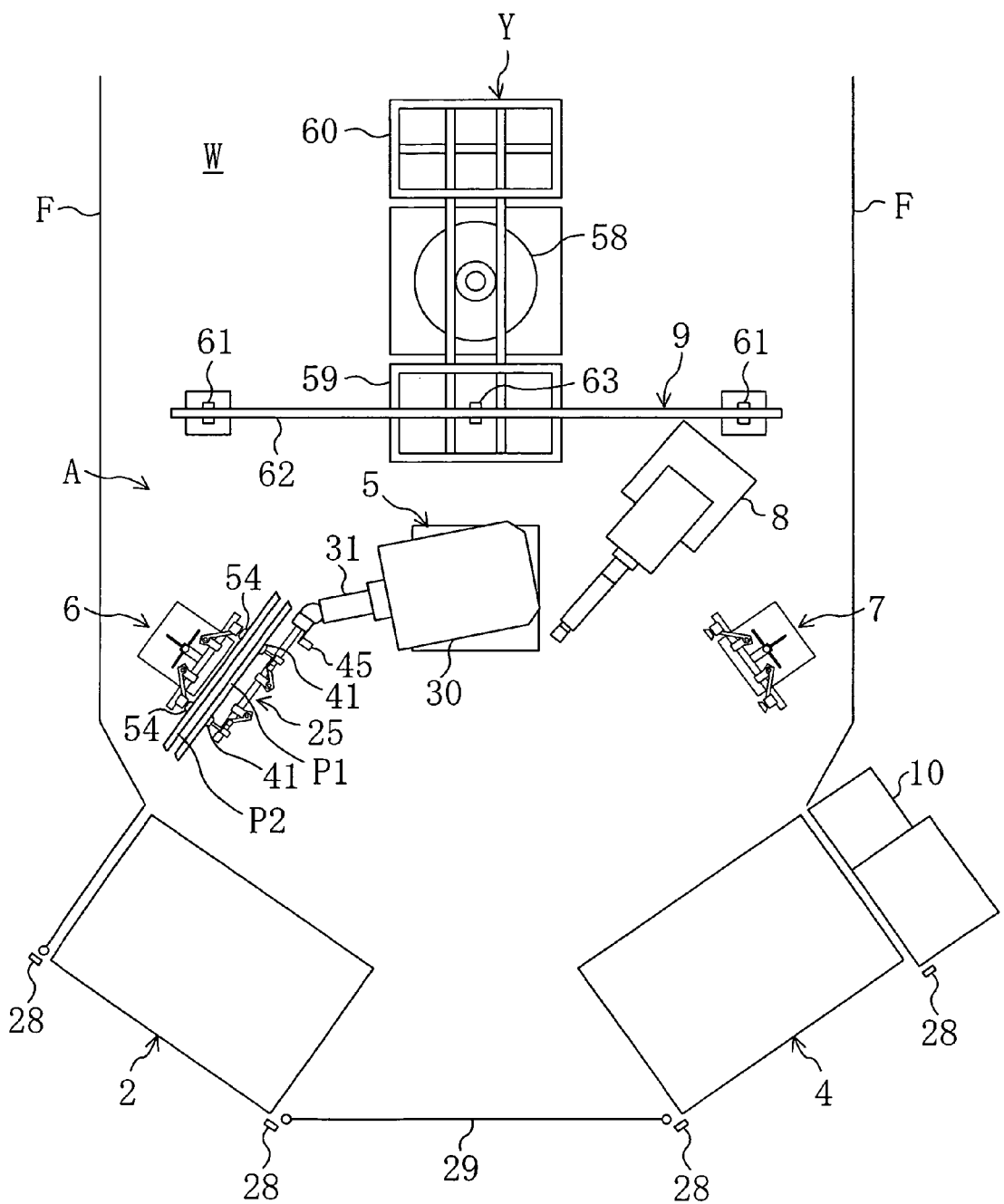
FIG. 13 is a view corresponding to FIG. 1 and showing a state that one of the outer panels is taken away from the other outer panel.

Next, the other outer panel P2 out of the taken-out outer panels P1, P2 is held to the right side temporal holder 6 temporally. In detail, when the outer panels P1, P2 are moved by the conveyance robot 5 so that the outboard face of the other outer panel P2 is in contact with the suction cups 54 of the right side temporal holder 6, as shown in FIG. 8B, FIG. 9, and FIG. 12, the other outer panel P2 is sucked by the suction cups 54, thereby being held to the right side temporal holder 6. After the other outer panel P2 is held to the right side temporal holder 6, the gripping material handling tool 25 is moved obliquely downward, as indicated by the virtual lines in FIG. 8B so that the upper edge of the one outer panel P1 is separated away from the upper edge of the other outer panel P2. This releases the engagement between the one outer panel P1 and the other outer panel P2, which means that only the one outer panel P1 is gripped by the gripping material handling tool 25, as shown in FIG. 13.

Figure 14:
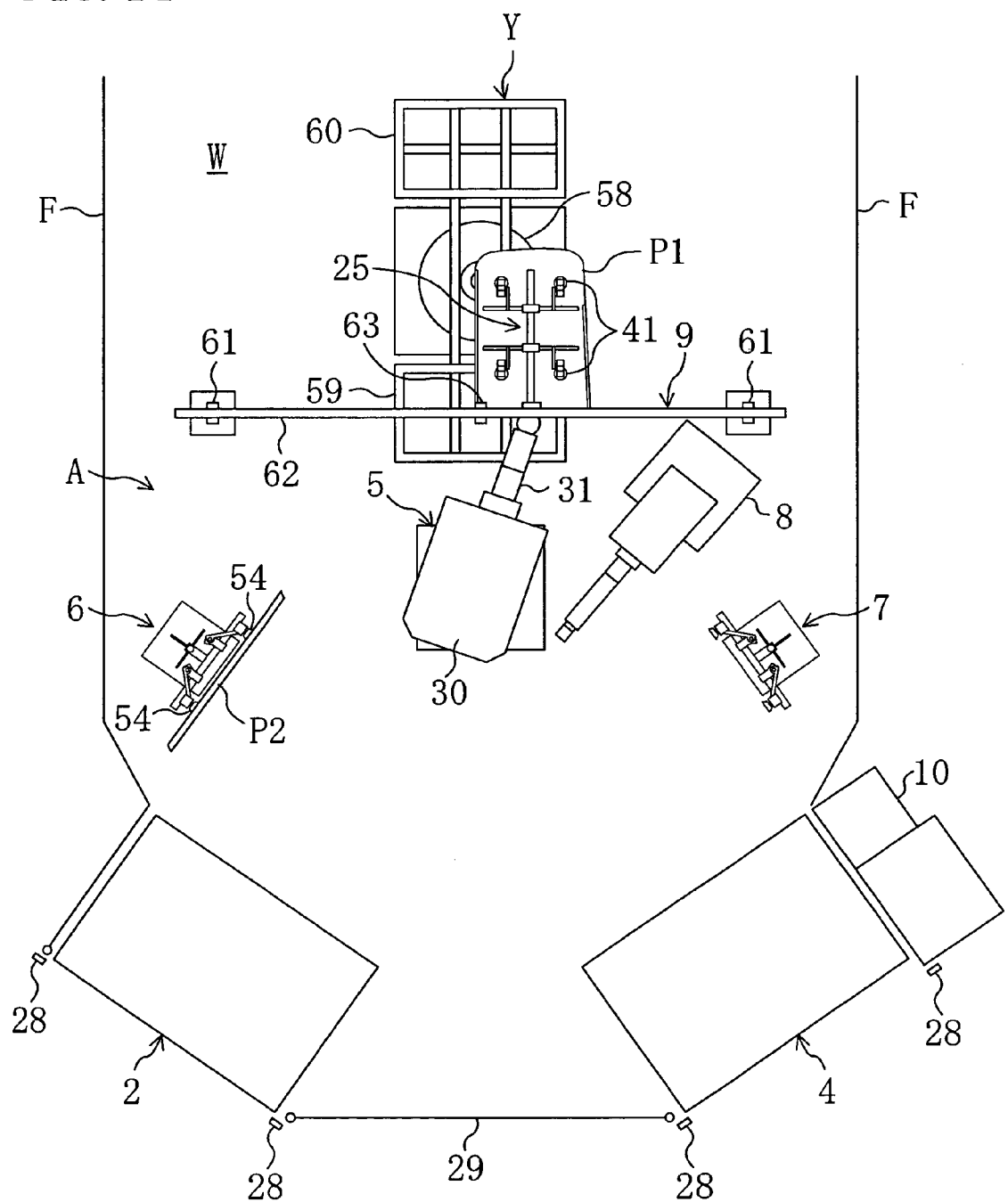
FIG. 14 is a view corresponding to FIG. 1 and showing a state that the relative positional relationship between an outer panel and the gripping material handling tool is detected.

Subsequently, as shown in FIG. 14, the one outer panel P1 is moved to a point under the fixed sensor 63 by the conveyance robot 5 for detecting the relative positional relationship between the one outer panel P1 and the gripping material handling tool 25. The one outer panel P1 is moved so that the inboard face thereof faces upward to allow the vehicle rear side edge of the one outer panel P1 to be in front of the fixed sensor 63.

Figure 15:
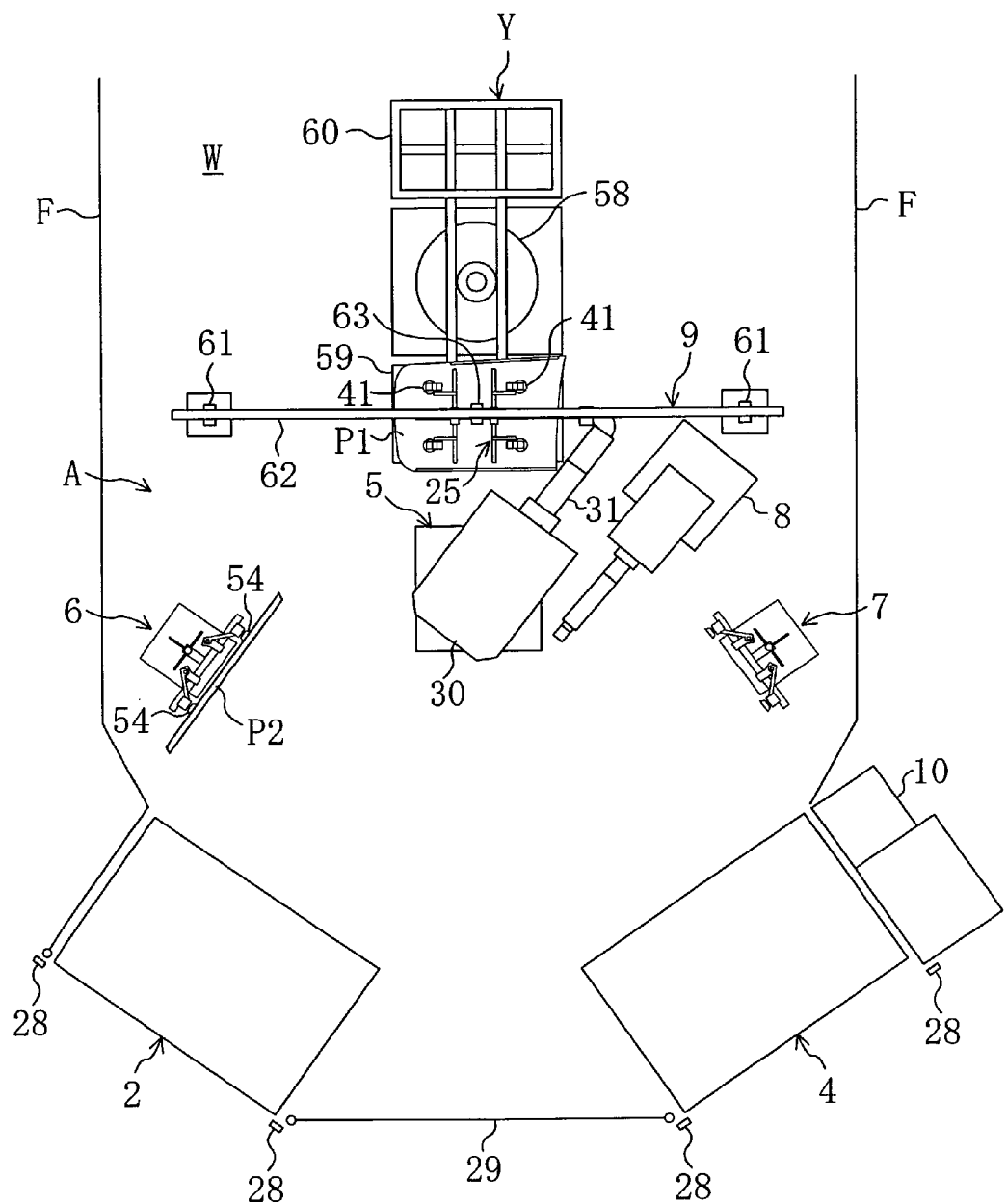
FIG. 15 is a view corresponding to FIG. 1 and showing a state that an outer panel is placed on a jig.

Upon detection of the relative positional relationship between the one outer panel P1 and the gripping material handling tool 25 by the fixed sensor 63, the controller 10 computes, when the relative positional relationship therebetween deviates from the regular positional relationship, a correction degree of the movement of the robot arm 31 according to the deviation amount thereof on the basis of the detection result. The fixed sensor 63, which is immovable in contrast to the movable sensor 45, can perform accurate detection, leading to exact and accurate correction of the movement of the robot arm 31 on the basis of an output from the fixed sensor 63. This enables accurate placement of the one outer panel P1 to the jig Y, as shown in FIG. 15, even if the relative positional relationship of the one outer panel P1 and the gripping material handling tool 25 deviates when the gripping material handling tool 25 grips the one outer panel P1. The one outer panel P1 is an outer panel P to be conveyed first.

Following placement of the one outer panel P1 to the jig Y, the suction force of the suction cups 41 is reduced for taking off the one outer panel P1 from the gripping material handling tool 25. The one outer panel P1 is fixed to the jig Y and then is coated at the peripheral part thereof with the sealant by the sealant coating robot 8 in the subsequent step. Then, the swivel table 28 is orated 180° so that the left door fixing section 60 is positioned on the conveyance robot 5 side.

Thereafter, a left door outer panel pair P is taken out from one of the left door component pallets and one of them is conveyed to the jig Y, like the right door outer panel pair P. After one of the paired left door outer panels P is conveyed and coated at the 25 peripheral part thereof with the sealant, the swivel table 58 is rotated 180°. Before the rotation, the one outer panel P1 is taken off from the right door fixing section 59 of the jig Y. Then, the movable sensor 45 is moved by the conveyance robot 5 and detects the three-dimensional position of the other outer panel P2 held to the right side temporal holder 6. On the basis of the information on the three-dimensional position thereof, the gripping material handling tool 25 is moved to allow the suction cups 41 of the material handling tool 25 to be in contact with the other outer panel P2, thereby allowing the gripping material handling tool 25 to grip the other outer panel P2. After griping of the other outer panel P2, the fixed sensor 63 detects the relative positional relationship between the other outer panel P2 and the gripping material handling tool 25, as described above, and then, the other outer panel P2 is conveyed to the right door fixing section 59 of the jig Y after correcting, if necessary, the movement of the robot arm 31. Since the other outer panel P2 has been already taken out from the right door component pallet 1 and is held to the right side temporal holder 6 near the jig Y, it is unnecessary to move the gripping material handling tool 25 to the right door component pallet 1 for panel taking-out operation, namely, for conveying the other outer panel P2 from the pallet 1, thereby reducing time required for conveyance. The other one of the left door outer panel pair P is conveyed to the jig Y in the same manner.

As described above, in the present embodiment, conveyance is performed in such a manner that: a pair of the two outer panels P1, P2 are stored in the pallet 1; the conveyance robot 5 takes out the pair of the two outer panels P1, P2 from the pallet 1 at one time and conveys the two outer panels P1, P2 one by one sequentially to the predetermined point of the jig Y. Employment of the conveyance robot 5 enables automated conveyance of the outer panels P. Further, it is unnecessary for the conveyance robot 5 to move to the pallet for taking out the next outer panel P2 after conveyance of the one outer panel P1 is completed, thereby reducing time required for conveying the outer panels P as a whole. Storage of the paired two outer pallets P in the pallet 1 increases the number of outer panels P that the single pallet 1 can store, lowering the frequency of carrying the pallets P in and out the assembly worksite.

The outer panel pair P is gripped by the gripping material handling tool 25 after detection of the three-dimensional positions of the outer panel pair P stored in the pallet 1 by the movable sensor 45, and the relative positional relationship between one of the paired outer panels P and the gripping material handling tool 25 is detected, in the course of conveyance of one of the paired outer panels P to the jig Y, by the fixed sensor 63 that can perform accurate position detection for exact correction of the movement of the robot arm 31. This enables accurate conveyance of each outer panel P to the jig Y even with displacement of the position of the outer panel pair P before gripping the pair by the gripping material handling tool 25 and/or with the displacement in gripping one of the paired outer panels P, necessitating seldom or no positional correction after conveyance. Thus, the production efficiency of the door increases.

The gripping material handling tool 25 grips the one outer panel P1 located on one side in the thickness direction of the paired outer panels P1, P2 while the temporal holder 6 holds the outer panel P2 located on the opposite side, so that the other outer panel P2 can be held to the temporal holder 6 without taking off the one outer panel P1 from the gripping material handling tool 25, thereby further reducing time required for conveying the outer panels P.

With the suction cups 41, 54 provided at the gripping material handling tool 25 and the temporal holder 6, respectively, when one of the paired outer panels P is in contact with to the suction cups 41 or 54, the gripping material handling tool 25 or the temporal holder 6 can grip the outer panel P readily. Further, since the cylinders 40 are open to the air during the time when the gripping material handling tool 25 grips the outer panel pair P, the suction cups 41 is prevented from being in hard contact with the outer panel pair P, suppressing deformation and damage of the outer panel pair P.

The gripping material handling tool 25 grips the recessed face of one of the paired outer panels P, resulting in efficient use of the space in the recessed face as part of the material handling entering space R to lead to compaction of the pallet 1.

The suction cups 41 of the gripping material handling tool 25 and the suction cups 54 of the temporal holder 6 are so arranged that at least respective parts of the suction faces thereof overlap with each other when facing each other. Accordingly, when the other outer panel P2 held to the temporal holder 6 is in contact with the suction cups 41 of the gripping material handling tool 25, the other outer panel P2 is interposed at substantially the same side parts in the thickness direction thereof by both the suction cups 41, 54, thereby suppressing deformation of the other outer panel P2.

When the number of the outer panel pairs P in the pallet 1 decreases, the movable sensor 45 is moved into the pallet 1 for detecting the position of the outer panel pair P so that the outer panel pair P is located within the detection range S of the movable sensor 45.

Though the two outer panels P1, P2 are paired and taken out from the pallet 1 at one time in the present embodiment, the outer panel pair P may be supported by the support members 20, 21 of the pallet 1 one by one so that only one of the paired outer panels P is taken out from the pallet 1 at one time. In this case, conveyance can be performed in such a manner that one of the paired outer panels P is gripped by the gripping material handling tool 25 after the three-dimensional position of the outer panel pair P in the pallet 1 is detected by the movable sensor 45, is moved directly to a point under the fixed sensor 63 for detecting the relative positional relationship between one of the paired outer panels P and the gripping material handling tool 25, and then, is conveyed to the jig Y. Namely, the temporal holder 6 can be dispensed with.

Further, the movable sensor 45 detects the three-dimensional position of the outer panel pair P, and the fixed sensor 63 detects the relative positional relationship between one of the paired outer panels P and the gripping material handling tool 25 in the present embodiment. While, conveyance may be performed with these sensors 45, 63 omitted in such a manner that one paired outer panels P1, P2 are taken out from the pallet 1, and then, the other outer panel P2 is held to the temporal holder 6 while the one outer panel P1 is conveyed to the jig Y first, as described above. This is enabled by teaching the conveyance robot 5 the position of the outer panel pair P before gripping with the outer panel pair P placed at a comparatively accurate place. This also eliminates the need of the gripping material handling tool 25 to move to the pallet 1 for taking out the next outer panel P2 after conveyance of the first outer panel P1 is completed, reducing time required for conveying the outer panels P as a whole.

In the present embodiment, the movable sensor 45 recognizes the outer handle mounting recessed part T1 or the outer handle mounting openings T2 in the outer panel pair P. The movable sensor 45 is, however, not limited thereto and may recognize the peripheral parts of the outer panel pair P or the like. As well, a part to be recognized by the fixed sensor 63 can be set arbitrarily. The positions where the movable sensor 45 and the fixed sensor 63 are mounted are not limited to the respective above points.

The number of suction cups 41 of the gripping material handling tool 25 and the number of suction cups 54 of the temporal holder 6 may be three or smaller or five or larger, wherein plural is desirable for stably holding the outer panel (s) P.

The present embodiment refers to the case where the present invention is applied to manufacture of doors provided at the sides of an automobile, but the present invention is applicable to manufacture of any of roughly-called lids including sliding doors, back doors, hoods, and the like of automobiles, for example,.

The work may be a reinforcement panel, a sash, a door hinge, or the like besides the outer panel and the inner panel.

The work storing means is not limited to the pallet and is applicable to various figures, such as a box and the like, for example.

INDUSTRIAL APPLICABILITY

The work conveying method and the work conveying apparatus according to the present invention can be used for conveying a press-formed outer panel stored in a pallet in a worksite for manufacturing a door for an automobile, for example.

What is claimed is:

1. A work conveying method for taking works out of a plurality of works stored in work storing means and conveying the works to a target site, comprising the steps of:
    storing a plurality of work sets, each of which composed of a plurality of works, into the work storing means;
    taking out a plurality of works at one time from the work storing means by using a work gripping means mounted at the tip end of a robot arm of a conveyance robot to grip a work set stored in the work storing means;
    using a temporal work holding means to hold temporally a work other than a work to be conveyed first to the target site out of the work sets;
    using the conveyance robot to convey to the target site the work to be conveyed first to the target site; and
    after the work to be conveyed first is conveyed to the target site, using the work gripping means to grip the work held to the temporal work holding means and conveying the work to the target site.

2. A work conveying apparatus for taking works out of a plurality of works stored in a work storing means that stores a plurality of work sets, each of the plurality of work sets being composed of a plurality of works, and conveying the works to a target site, comprising:
    a conveyance robot which includes a robot arm having work gripping means for gripping a work set stored in the work storing means and which conveys a work gripped by the work gripping means to the target site;
    temporal work holding means which holds temporally a work other than a work to be conveyed first to the target site out of the work set gripped by the work gripping means;
    a movable sensor fitted to the work gripping means and being capable of detecting a position of a work set stored in the work storing means;
    a sensor support table;
    a fixed sensor configured to detect a relative positional relationship between the work gripped by the work gripping means and the work gripping means, the fixed sensor being fixed to the ground via the sensor support table; and
    a controller to which the movable sensor and the fixed sensor are connected and which controls the conveyance robot on the basis of output signals from the sensors,
    wherein the controller is configured to control, on the basis of information on the position of the work set detected by the movable sensor, the work gripping means to move to a place where the work set is to be gripped, and the controller is further configured to correct, on the basis of information on the relative positional relationship between the works and the work gripping means detected by the fixed sensor, movement of the robot arm so that the work is conveyed to the target site; and
    wherein each of the work sets stored in the work storing means is composed of a plurality of panel-like works overlaid with each other in the thickness direction,
    the work gripping means includes a cylinder which extends and contracts by supply and discharge of working fluid and a suction cup fitted at the tip end of a rod of the cylinder, the cylinder allowing the rod to extend and contract freely by external force under a state that no working fluid is supplied,
    the suction cup grips a work out of the work set which is located on one side in the thickness direction of the work set, and
    the temporal work holding means grips a work located on the other side in the thickness direction of the work set.

* * * * *